United States Patent
Ozeki et al.

(10) Patent No.: US 7,878,944 B2
(45) Date of Patent: Feb. 1, 2011

(54) CONTROL METHOD OF A POWER TRANSMISSION DEVICE

(75) Inventors: Takashi Ozeki, Saitama (JP); Yoshiaki Tsukada, Saitama (JP); Akihiko Tomoda, Saitama (JP); Haruomi Sugita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 611 days.

(21) Appl. No.: 11/905,125

(22) Filed: Sep. 27, 2007

(65) Prior Publication Data

US 2008/0081737 A1 Apr. 3, 2008

(30) Foreign Application Priority Data

Sep. 29, 2006 (JP) .............................. 2006-270068

(51) Int. Cl.
*B60W 10/04* (2006.01)
(52) U.S. Cl. ...................................................... 477/115
(58) Field of Classification Search ................ 477/115, 477/122, 123, 125, 154
See application file for complete search history.

(56) References Cited

U.S. PATENT DOCUMENTS

| | | | |
|---|---|---|---|
| 2,804,284 A | | 8/1957 | Often et al. |
| 4,827,802 A | * | 5/1989 | Marier ....................... 477/123 |
| 5,035,160 A | * | 7/1991 | Morita ....................... 477/154 |
| 7,367,415 B2 | * | 5/2008 | Oliver et al. ........... 180/65.275 |
| 7,704,189 B2 | * | 4/2010 | Baur et al. ................... 477/180 |
| 2001/0023385 A1 | * | 9/2001 | Nishimura et al. ............ 701/51 |
| 2006/0172855 A1 | * | 8/2006 | Pollak et al. ................... 477/70 |

FOREIGN PATENT DOCUMENTS

| | | |
|---|---|---|
| DE | 31 45 016 A1 | 6/1982 |
| EP | 1 544 513 A2 | 6/2005 |
| GB | 637235 | 5/1950 |
| JP | 8-183372 A | 7/1996 |
| JP | 3509243 B2 | 1/2004 |

* cited by examiner

*Primary Examiner*—Roger Pang
(74) *Attorney, Agent, or Firm*—Birch, Stewart, Kolasch & Birch, LLP

(57) ABSTRACT

To provide a control method for a power transmission device which can prevent the generation of impacts and noises when a speed change mechanism is changed over from a neutral state to a first speed gear without using a brake mechanism. In a control method of a power transmission device for controlling a power transmission device for transmitting a rotational power of a crankshaft of an internal combustion engine to an output side by way of a clutch mechanism and a speed change mechanism, the speed change mechanism is automatically changed over from a neutral state to a first speed gear during a period from a point in time Ts at which an ignition switch is turned on to a point in time at which an engine rotational speed arrives at a steady-state idling rotational speed Nid due to the starting of an internal combustion engine.

13 Claims, 6 Drawing Sheets

CONTROL METHOD OF A POWER TRANSMISSION DEVICE

CROSS-REFERENCE TO RELATED APPLICATIONS

The present application claims priority under 35 USC 119 to Japanese Patent Application No. 2006-270068 filed on Sep. 29, 2006 the entire contents of which are hereby incorporated by reference.

BACKGROUND OF THE INVENTION

1. Field of the Invention

The present invention relates to a control method for a power transmission device of an internal combustion engine.

2. Description of Background Art

In a power transmission device for transmitting rotational power from a crankshaft of an internal combustion engine to an output side by way of a clutch mechanism and a speed change mechanism, the internal combustion engine is started by a starter in a state wherein the clutch mechanism is in a disengaged state. In addition, the internal combustion engine assumes an idling state at a steady-state idling rotational speed. At this time, cranking is also finished.

In such an idling state, the speed change mechanism is changed over from a neutral state to a first speed gear, and the clutch mechanism is brought into an engaged state thus transmitting the power to the output side of the speed change mechanism.

In the idling state of the internal combustion engine, the clutch mechanism is in a disengaged state. However, when a clutch input side of the clutch mechanism is rotated due to the rotation of the crankshaft, a clutch output side of the clutch mechanism is rotated together with the clutch input side by friction. In addition, a speed change drive side of the speed change mechanism which is continuously connected with the clutch output side is rotated. Thus, when the speed change mechanism is changed to the first speed gear from the neutral state, a speed change driven side which is not rotated is momentarily engaged with the rotating clutch output side and the speed change drive side which are rotated due to a rotational inertia thus generating impacts and noises.

Various kinds of techniques have been proposed for preventing the generation of impacts and noises. See, for example, Japanese Patent No. 3509243.

A power transmission device disclosed in Japanese Patent No. 3509243 includes a brake mechanism for performing braking by bringing a brake shoe into contact with a clutch outer (clutch output side) of a start clutch only when a speed change mechanism is changed over from a neutral state to a first speed gear.

More specifically, in changing over the speed from the neutral state to the first speed gear, by applying braking to the clutch outer of the start clutch thus preventing the co-rotation of the clutch outer, the speed change drive side and the speed change driven side, which have no relative rotation or exhibit a small difference in rotational speed therebetween, are engaged with each other. Thus, there is no possibility that impacts and noises are generated.

However, it is necessary to additionally provide the brake mechanism which performs braking by bringing the brake shoe into contact with the clutch outer of the start clutch only when the speed change mechanism is changed over from a neutral state to a first speed gear. Thus, the number of parts is increased and the surrounding of the clutch mechanism becomes complicated thus increasing the cost.

SUMMARY AND OBJECTS OF THE INVENTION

It is an object of an embodiment of the present invention to provide a control method for a power transmission device which requires no braking mechanism at a low cost and can prevent the generation of impacts and noises when a speed change mechanism is changed over from a neutral state to a first speed gear.

To achieve the above-mentioned object according to the present invention, a control method of a power transmission device is provided for controlling a power transmission device which transmits a rotational power of a crankshaft of an internal combustion engine to an output side by way of a clutch mechanism and a speed change mechanism. The speed change mechanism is automatically changed over from a neutral state to a first speed gear during a period from a point in time at which an ignition switch is turned on to a point in time at which an engine rotational speed arrives at a steady-state idling rotational speed due to the starting of an internal combustion engine.

It is an object of an embodiment of the present invention to provide the speed change mechanism for automatically changing over from the neutral state to the first speed gear at a point in time at which the engine rotational speed arrives at a predetermined low-rotational speed lower than the idling rotational speed by turning on a starter switch.

It is an object of an embodiment of the present invention to provide the speed change mechanism to be automatically changed over from the neutral state to the first speed gear at a point in time at which a predetermined time elapses after turning on the ignition switch.

It is an object of an embodiment of the present invention, to provide in a control method of a power transmission device for controlling a power transmission device which transmits a rotational power of a crankshaft of an internal combustion engine to an output side by way of a clutch mechanism and a speed change mechanism wherein the speed change mechanism is automatically changed over from a neutral state to a first speed gear at a point in time at which an ignition switch is turned on.

It is an object of an embodiment of the present invention, to provide the speed change mechanism to be automatically changed over from the neutral state to the first speed gear during the period from the point in time at which the ignition switch is turned on to the point in time at which the engine rotational speed arrives at the steady-state idling rotational speed due to starting of the internal combustion engine. Thus, when the rotation of the crankshaft rotates the clutch input side of the clutch mechanism, in spite of the disengagement of the clutch mechanism, the rotation of the crankshaft rotates the clutch output side together with the clutch input side. Further, even when the speed change drive side of the speed change mechanism is rotated, the engine rotational speed does not arrive at a steady-state idling rotational speed in changing over the speed change mechanism to the first speed gear from the neutral state. Thus, the rotational speed of the clutch output side is small whereby the impacts and noises which are generated along with the changeover of the speed change mechanism from the neutral state to the first speed gear can be decreased.

By making the mechanism for braking the clutch output side which is rotated together with the clutch input side unnecessary, it is possible to simplify the structure of the speed change mechanism and to miniaturize the internal combustion engine and to reduce a manufacturing cost.

According to the control method of the power transmission device of an embodiment of the present invention, the speed change mechanism is automatically changed over from the neutral state to the first speed gear at the point in time at which the engine rotational speed arrives at the predetermined low-rotational speed lower than the idling rotational speed by turning on the starter switch. Thus, it is possible to adjust a degree of suppressing impacts and noises which are generated along with the changeover of the speed change mechanism from the neutral state to the first speed gear.

According to the control method of the power transmission device of an embodiment of the present invention, the speed change mechanism is automatically changed over from the neutral state to the first speed gear at the point in time at which the predetermined time elapses after turning on the ignition switch. Accordingly, even when the speed change mechanism is changed over from the neutral state to the first speed gear before and after the point in time that the starter switch is turned on during the period from the point in time at which the ignition switch is turned on to the point in time at which the engine rotational speed arrives at the steady-state idling rotational speed due to starting of the internal combustion engine, the rotational speed of the clutch output side which is rotated together with the clutch input side can be set to 0 or a small value. Thus, the impacts and noises which are generated along with the changeover of the speed change mechanism from the neutral state to the first speed gear can be decreased.

According to the control method of the power transmission device of an embodiment of the present invention, by performing the control such that the speed change mechanism is changed over from the neutral state to the first speed gear at the point in time at which the ignition switch is turned on, the speed change mechanism is changed over from the neutral state to the first speed gear in a state that the crankshaft is stopped. Thus, there is no possibility that impacts and noises are generated along with the changeover of the speed change mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment according to the invention is explained in conjunction with FIG. 1 to FIG. 5.

Figure 1:
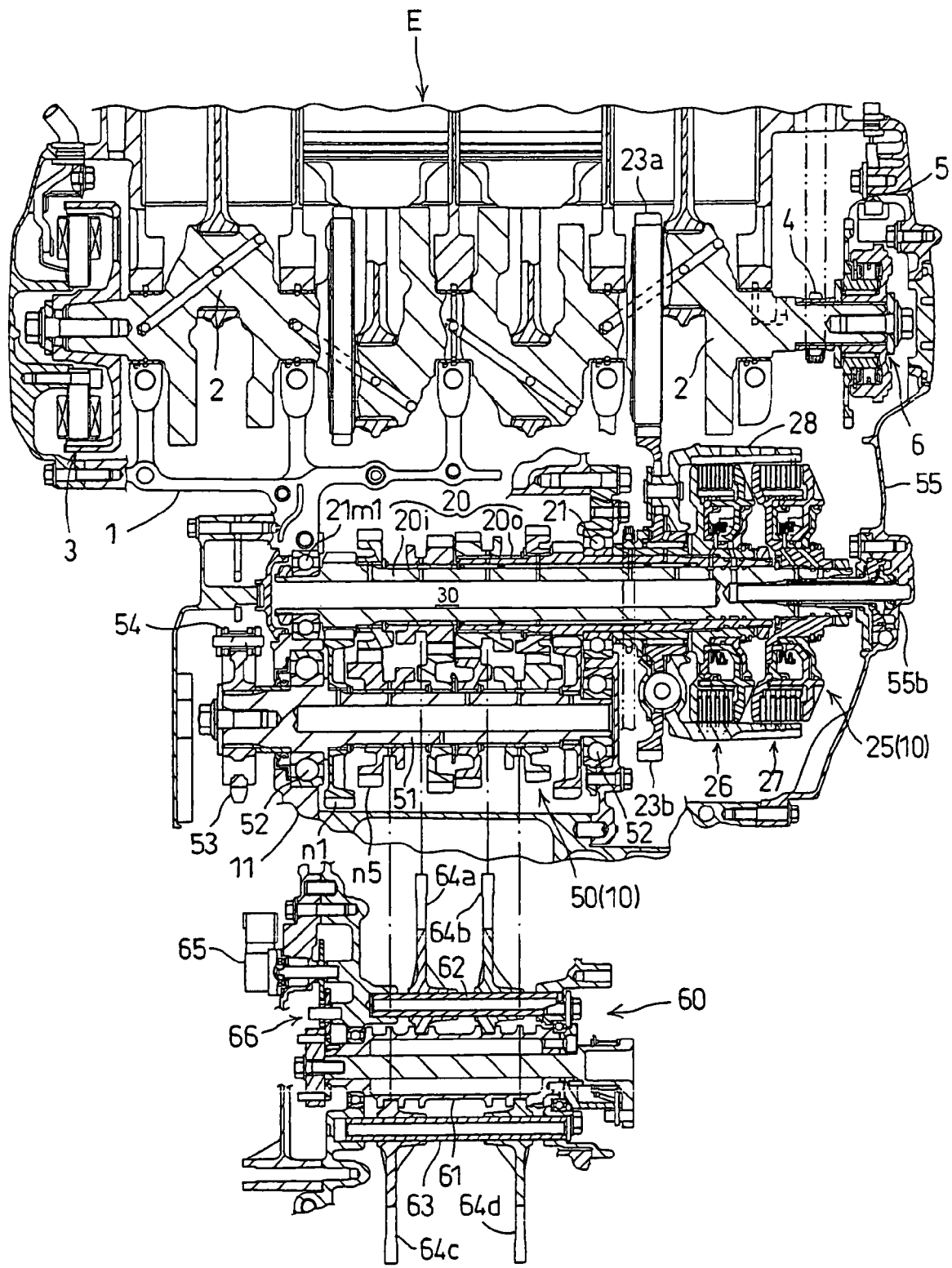
FIG. 1 is a cross-sectional view showing an essential part of an internal combustion engine in which a power transmission device according to one embodiment of the invention is incorporated.

A vehicle-use power transmission device 10 according to this embodiment sets forth a power transmission device which is assembled in a 4-cylinder 4-stroke internal combustion engine E mounted on a motorcycle. FIG. 1 is a cross-sectional view of an essential part of the power transmission device 10.

The internal combustion engine E is mounted on a vehicle with a crankshaft 2 thereof directed in the lateral direction. The crankshaft 2 is pivotally and rotatably mounted on a crankcase 1. An AC generator 3 is mounted on a left end portion of the crankshaft 2 which projects to the left from the crankcase 1. A valve-drive-system chain sprocket wheel 4, an engine-start-system driven gear 5 and a one-way clutch 6 are mounted on a right end portion of the crankshaft 2 which projects to the right from the crankcase 1.

The engine-start-system driven gear 5 constitutes a final gear of a speed reduction gear mechanism which transmits drive from a starter motor not shown in the drawing. The drive of the starter motor is transmitted to the crankshaft 2 by way of the speed reduction gear mechanism and the one-way clutch 6 and forcibly rotates the crankshaft 2 thus starting the internal combustion engine E.

A rear side of the crankcase 1 has a lateral width thereof that is narrowed thus forming a transmission case 11. A main shaft 20 and a counter shaft 51, which are directed in the lateral direction of the transmission case 11, are respectively and pivotally and rotatably supported on the transmission case 11 by way of bearings 21, 52.

The main shaft 20 is constituted by an inner sleeve 20i and an outer sleeve 20o which are rotatably fitted on a portion of the inner sleeve 20i. A left end of the inner sleeve 20i is pivotally and rotatably mounted in a bearing opening which is formed in a left side wall 11l of the transmission case 11 by way of the bearing 21. The outer sleeve 20o is relatively rotatably fitted on a substantially central position of the inner sleeve 20i. A portion of the outer sleeve 20o is pivotally and rotatably supported in a bearing opening which is formed in a right side wall 11r of the transmission case 11 by way of the bearing 21. In this manner, the outer sleeve 20o is supported together with the inner sleeve 20i.

A cylindrical collar 22 is fitted on a portion of an outer periphery of an outside portion of the outer sleeve 20o which projects to the right from the right bearing 21 and is brought into contact with the right bearing 21. A primary driven gear 23 is pivotally and rotatably supported on the cylindrical collar 22.

On the other hand, a primary drive gear 23a is formed on one crank web of the crankshaft 2 which corresponds to the primary driven gear 23b. The primary drive gear 23a and the primary driven gear 23b are meshed with each other.

A twin clutch 25 is mounted on the inner sleeve 20i and the outer sleeve 20o on a right side of the primary driven gear 23b.

The twin clutch 25 is constituted of a pair of first clutch 26 and second clutch 27, and the first clutch 26 and the second clutch 27 are formed of hydraulic multi-plate friction clutches of the same structure which include a common clutch housing 28.

The clutch housing 28 is formed of a bowl-shaped member which constitutes a common outer peripheral portion of the first clutch 26 and a second clutch 27 which are arranged in parallel in the axially lateral direction. The clutch housing 28 has a right side thereof opened and has a left-side bottom portion thereof mounted on the primary driven gear 23b by way of a torsion spring 24.

The left-side first clutch 26 is configured such that a clutch boss 26b is engaged with the outer sleeve 20o by spline fitting and a pressure plate 26p is slidably supported on the clutch boss 26b in the axial direction, and an oil pressure receiving plate 26q is supported on a back side of the pressure plate 26p.

A compression spring 26s is interposed between the pressure plate 26p and the clutch boss 26b.

Between outer peripheral portions of the clutch boss 26b and the pressure plate 26p, friction discs which are slidably fitted in the clutch housing 28 in the axial direction and clutch discs which are slidably fitted on the clutch boss 26b in the axial direction are arranged alternately.

The right-side second clutch 27 is configured such that a clutch boss 27b is engaged with a portion of the inner sleeve 20i which projects to the right from the outer sleeve 20o by spline fitting. A pressure plate 27p is slidably supported on the clutch boss 27b in the axial direction with an oil pressure receiving plate 27q being supported on a back side of the pressure plate 27p. A compression spring 27s is interposed between the pressure plate 27b and the clutch box 27b.

Between outer peripheral portions of the clutch boss 27b and the pressure plate 27p, friction discs are arranged alternately which are slidably fitted in the clutch housing 28 in the axial direction and clutch discs which are slidably fitted in the clutch boss 27b in the axial direction.

In the inner sleeve 20i, a lubricant passage 30 is formed along an axis of the inner sleeve 20i from a left end of the inner sleeve 20i to a position where the first clutch 26 is arranged and a shaft hole 31 is formed along the axis from a right end of the inner sleeve 20i to a position where the first clutch 26 is arranged. In the shaft hole 31, a duplicate tube which is constituted of an inner conduit 32 and an outer conduit 33 are inserted from the right end of the inner sleeve 20i.

The inner conduit 32 arrives at a position of the first clutch 26 in the vicinity of a left end of the shaft hole 31, and the outer conduit 33 arrives at a position of the second clutch 27.

A seal member 34 is interposed between an outer periphery of the inner conduit 32 in the vicinity of a left end of the inner conduit 32 and the shaft hole 31, a left end space of the shaft hole 31, which is defined by the seal member 34, is in communication with a first control oil passage 41 formed in the inside of the inner conduit 32. At the same time, an oil passage 41a is formed in the inner sleeve 20i, the outer sleeve 20o and a sleeve portion of the clutch boss 26b in a penetrating manner toward a gap defined between the pressure plate 26p and the oil pressure receiving plate 26s of the first clutch 26 from the left end space of the shaft hole 31.

The space defined between the pressure plate 26p and the clutch boss 26b is in communication with the lubricant passage 30 by way of the oil passage 30a.

Accordingly, when oil pressure is applied to a first control oil passage 41 which is arranged inside the inner conduit 32, pressurised oil is supplied to the space defined between the pressure plate 26p and the oil pressure receiving plate 26s of the first clutch 26 by way of the oil passage 41 and the left end space of the shaft hole 31, and the pressure plate 26p is pushed against a biasing force of the compression spring 26s. Accordingly, the first clutch 26 is engaged with the clutch housing 28 due to the increase of the friction between the friction discs and the clutch discs. Thus, the rotation of the clutch housing 28 is transmitted to the outer sleeve 20o of the main shaft 20.

When the oil pressure which is applied to the first control oil passage 41 is released, due to the oil pressure of the lubricant which passes through the lubricant passage 30 and the oil passage 30a and the compression spring 26s, the pressure plate 26p returns to an original position. Thus, the first clutch 26 is disengaged.

Further, a seal member 35 is interposed between an outer periphery of the outer conduit 33 in the vicinity of a left end of the outer conduit 33 which arrives at a position of the second clutch 27 and the shaft hole 31. A second control oil passage 42 is formed between an outer periphery of the outer conduit 33 on a right side of the seal member 35 and an inner periphery of the shaft hole 31. An oil passage 42a is formed in the inner sleeve 20i and a cylindrical portion of the clutch boss 27b in a penetrating manner from the second control oil passage 42 to a gap defined between the pressure plate 27p and the oil receiving plate 27s of the second clutch 27.

Here, a lubricant passage 43 defined between the outer periphery of the inner conduit 32 on a left side of the seal member 35 and the inner periphery of the outer conduit 33 is in communication with a space formed on a left side of the seal member 35, and the space formed on the left side of the seal member 35 is in communication with a space defined between the pressure plate 27p and the clutch boss 27b by way of an oil passage 43a.

Accordingly, when oil pressure is applied to the second control oil passage 42 which is arranged outside of the outer conduit 33, pressurized oil is supplied to the space defined between the pressure plate 27p and the oil pressure receiving plate 27s of the second clutch 27 by way of the oil passage 42a, and the pressure plate 27p is pushed against a biasing force of the compression spring 27s. Accordingly, the second clutch 27 is engaged with the clutch housing 28 due to the increase in the friction between the friction disc and the clutch disc. Thus, the rotation of the clutch housing 28 is transmitted to the inner sleeve 20i of the main shaft 20.

When the oil pressure which is applied to the second control oil passage 42 is released, due to the oil pressure of the lubricant which passes through the lubricant passage 43 and the oil passage 43a and the compression spring 27s, the pressure plate 27p returns to an original position and the second clutch 27 is disengaged.

In a shaft support portion 55a of a right case cover 55 which pivotally supports end portions of the inner conduit 33 and the outer conduit 33 which project from a right end of the inner sleeve 20i, hydraulic chambers 41b, 42b which are respectively in communication with the first control oil passage 41 and the second control oil passage 42 are formed, and controlled oil pressures are applied to the hydraulic chambers 41b, 42b by an oil pressure control means thus controlling the engagement and disengagement of the respective first clutch 26 and second clutch 27.

In the inside of the above-mentioned transmission case 11 into which the main shaft 20 to which the power of the twin clutch 25 is transmitted is inserted, a speed change gear mechanism 50 is provided between the main shaft 20 and a counter shaft 51.

The outer sleeve 20o of the main shaft 20 covers a right half portion of the inner sleeve 20i in the inside of the transmission case 11. With respect to the inner sleeve 20i which projects to the left from the outer sleeve 20o, a first speed change drive gear m1 is integrally formed on the inner sleeve 20i close to the left-side bearing 21, and a fifth speed change drive idle gear m5 is pivotally mounted on the inner sleeve 20i in a state wherein the fifth speed change drive idle gear m5 is arranged on a right side of the first speed change drive gear m1, and a third speed change drive shift gear m3 is engaged with the inner sleeve 20i by spline fitting in an axially slidable manner between a right side of the fifth speed change drive idle gear m5 and a left end of the outer cylinder 20o.

When the third speed change drive shift gear m3 is shifted to the left from a neutral position, the third speed change drive shift gear m3 is connected to the fifth speed change drive idle gear m5.

With respect to the outer sleeve 20o arranged in the inside of the transmission case 11, a second speed change drive gear m2 is integrally formed on the outer sleeve 20o close to the right-side bearing 21, and a sixth speed change drive idle gear m6 is pivotally and rotatably supported on the outer sleeve 20o on a left side of the second speed change drive gear m2, and a fourth speed change drive shift gear m4 is engaged with the outer sleeve 20o by spline fitting in an axially slidable manner between a left side of the sixth speed change drive idle gear m6 and a left end of the outer cylinder 20o.

When the fourth speed change drive shift gear m4 is shifted to the right from a neutral position, the fourth speed change drive shift gear m4 is connected to the sixth speed change drive idle gear m6.

On the other hand, with respect to the counter shaft 51, a first speed change driven idle gear n1 is pivotally and rotatably supported on the counter shaft 51 close to the left-side bearing 52, and the first speed change driven idle gear n1 is meshed with the first speed change drive gear m1. Further, a fifth speed change driven shift gear n5 is engaged with the counter shaft 51 by spline fitting in an axially slidable manner on a right side of the first speed change driven idle gear n1, and the fifth speed change driven shift gear n5 is meshed with the fifth speed change drive idle gear m5. Further, a third speed change driven idle gear n3 is pivotally and rotatably supported on the counter shaft 51 on a right side of the fifth speed change driven shift gear n5.

When the fifth speed change driven shift gear n5 is shifted to the left from a neutral position, the fifth speed change driven shift gear n5 is connected to the first speed change driven idle gear n1, while when the fifth speed change driven shift gear n5 is shifted to the right from a neutral position, the fifth speed change driven shift gear n5 is connected to the third speed change driven idle gear n3.

Further, with respect to a right half portion of the counter shaft 51, a second speed change driven idle gear n2 is rotatably and pivotally mounted close to the right-side bearing 52 and is meshed with the second speed change drive gear m2, a sixth speed change driven shift gear n6 is engaged with the counter shaft 51 by spline fitting in an axially slidable manner on a left side of the second speed change driven idle gear n2 and is meshed with the sixth speed change drive idle gear m6, and a fourth speed change driven idle gear n4 is pivotally and rotatably supported on a left side of the sixth speed change driven shift gear n6 and is meshed with the fourth speed change drive shift gear m4.

When the sixth speed change driven shift gear n6 is shifted to the right from a neutral position, the sixth speed change driven shift gear n6 is connected to the second speed change driven idle gear n2, while when the sixth speed change driven shift gear n6 is shifted to the left, the sixth speed change driven shift gear n6 is connected to the fourth speed change driven idle gear n4.

As described heretofore, the speed change gear mechanism 50 of this embodiment is a constant-mesh speed change gear mechanism. By shifting four shift gears, that is, by shifting the third speed change drive shift gear m3 and the fourth speed change drive shift gear m4 which are mounted on the main shaft 20 and the fifth speed change driven shift gear n5 and the sixth speed change driven shift gear n6 which are mounted on the counter shaft 51 using four shift forks 64a, 64b, 64c, 64d of the speed change drive mechanism 60, the changeover of the speed change gear can be performed.

The speed change drive mechanism 60 is configured such that a shift drum 61 is directed in the lateral direction and is pivotally and rotatably supported on the transmission case 11. Guide shafts 62, 63 extend over the speed change drive mechanism 60 in a state wherein the guide shafts 62, 63 are arranged close to the shift drum 61 with shift forks 64a, 64b that are pivotally mounted on the guide shaft 62 arranged close to the main shaft 20 in an axially slidable manner and are engaged with the third speed change drive shift gear m3 and the fourth speed change drive shift gear m4 which are mounted on the main shaft 20. At the same time, respective shift pins of the shift forks 64a, 64b are fitted in respective shift grooves which are formed in an outer peripheral surface of the shift drum 61.

Further, shift fork 64c, 64d are pivotally mounted on the guide shaft 63 and are arranged close to the counter shaft 51 in an axially slidable manner and are engaged with the fifth speed change driven shift gear n5 and the sixth speed change driven shift gear n6 which are mounted on the counter shaft 51. At the same time, respective shift pins of the shift forks 64c, 64d are fitted in respective shift grooves which are formed in the outer peripheral surface of the shift drum 61.

The shift drum 61 is rotated by driving of a speed change motor 65 by way of a gear mechanism 66 and four shift forks 64a, 64b, 64c, 64d which are fitted in four shift grooves respectively perform predetermined movements depending on a rotational angle of the shift drum 61 so as to change over the speed change gears of the speed change gear mechanism 50.

Figure 2:
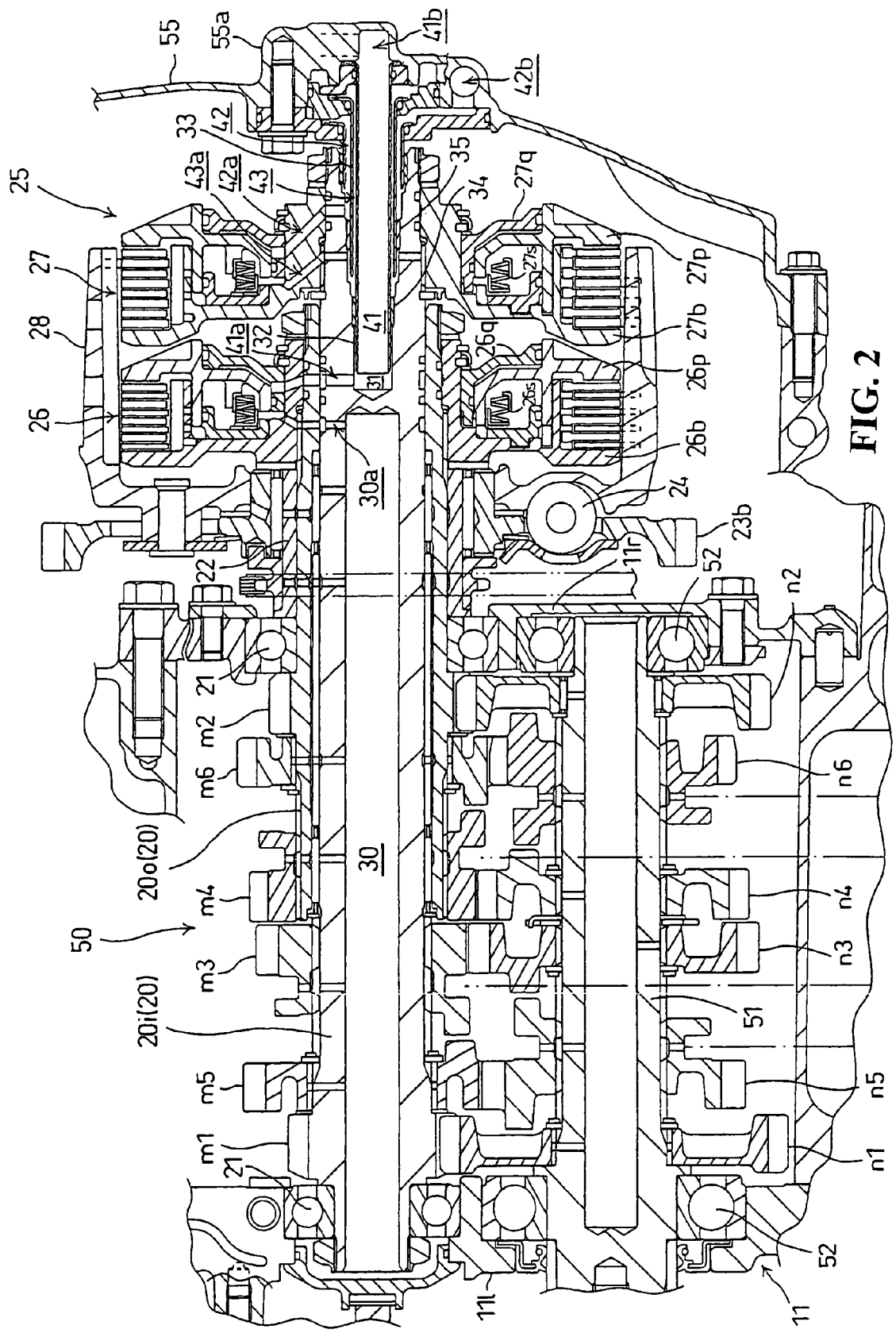
FIG. 2 is a cross-sectional view of the power transmission device.

FIGS. 1 and 2 show the speed change gear mechanism 50 in a neutral state in which either one of gears which are meshed with each other is in an idling state. Thus, the rotation of the main shaft 20 is not transmitted to the counter shaft 51.

When the shift drum 61 is rotated by a predetermined angle and the shift fork 64c shifts the fifth speed change driven shift gear n5 to the left and brings the fifth speed change driven shift gear n5 into contact with the first speed change driven idle gear n1 from the above-mentioned neutral state, power is transmitted to the counter shaft 51 from the inner sleeve 20I by way of the first speed change drive gear m1, the first speed change driven idle gear n1, and the fifth speed change driven shift gear n5 thus constituting a first speed gear.

In the same manner as the first speed gear, a second gear is constituted by shifting the sixth speed change driven shift gear n6 to the right, a third speed gear is constituted by shifting the fifth speed change driven shift gear n5 to the right, a fourth speed gear is constituted by shifting the sixth speed change driven shift gear n6 to the left, a fifth speed gear is constituted by shifting the third speed change drive shift gear m3 to the left, and a sixth speed gear is constituted by shifting the fourth speed change drive shift gear m4 to the right.

The counter shaft 51 on which the speed change driven gears are pivotally mounted constitutes an output shaft, and an output sprocket wheel 53 is fitted on a left end portion of the counter shaft 51 which projects further to the left from the left-side bearing 52.

A drive chain 54 extends between the output sprocket wheel 53 and the rear drive wheel-side driven sprocket wheel, and the power is transmitted to the rear drive wheel thus allowing the motorcycle to travel.

In the above-mentioned power transmission device 10 which transmits the rotational power of the crankshaft 2 of the internal combustion engine E to the output shaft (counter shaft 51) by way of the twin clutch 25 and the speed change gear mechanism 50, an oil pressure control of the twin clutch 25 and a speed change control of the speed change drive mechanism 60 which drives the speed change gear mechanism 50 are performed by an ECU which performs an operational control of the internal combustion engine E.

Figure 3:
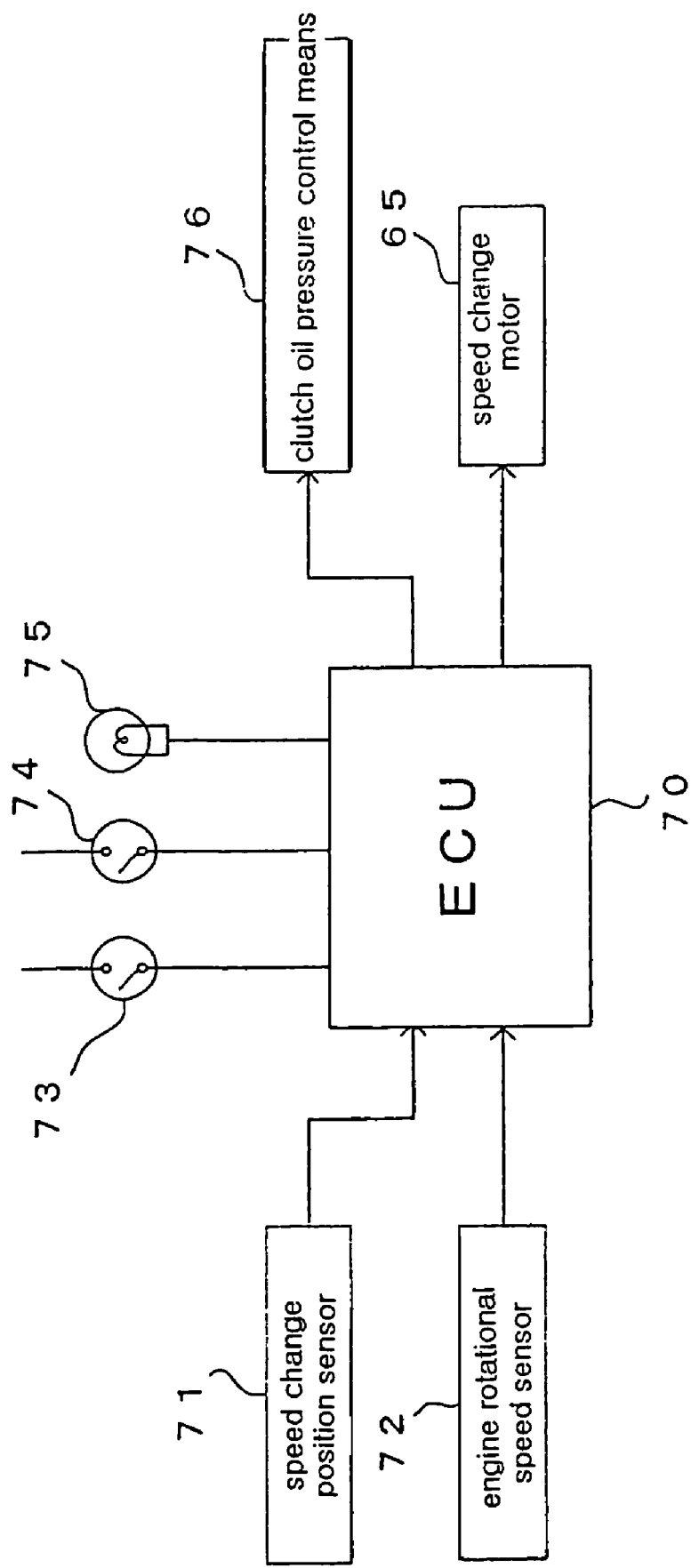
FIG. 3 is a schematic block diagram of a speed change control.

FIG. 3 is a schematic block diagram of a speed change control performed by an ECU 70.

Detection signals are inputted to the ECU 70 from a speed change position sensor 71 and an engine rotational speed sensor 72 and, at the same time, an ON/OFF signal of an ignition switch 73 is inputted to the ECU 70. The ECU 70 outputs drive signals to the speed change motor 65 and a clutch oil pressure control means 76.

A vehicle having a D-mode changeover switch 74, which allows a rider to intentionally bring the vehicle into a start ready state, provides an ON/OFF signal of the D-mode changeover switch 74 that is inputted to an ECU. Further, in a vehicle having a neutral lamp 75, an ECU outputs a drive signal to the neutral lamp 75.

Figure 4:
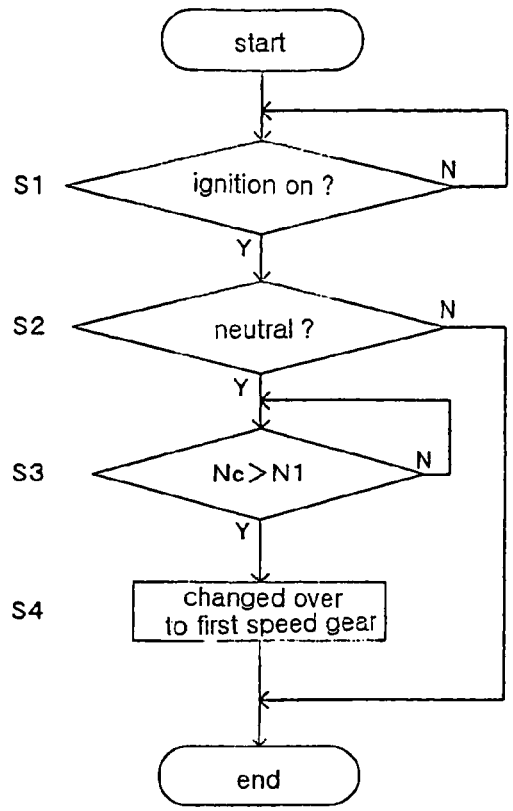
FIG. 4 is a control flowchart of the speed change control.
Figure 5:
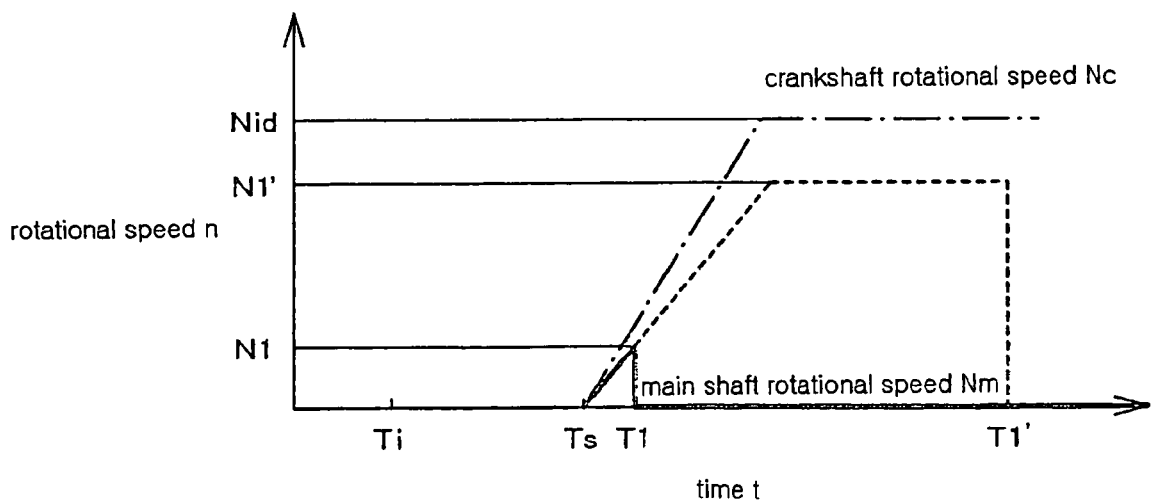
FIG. 5 is a graph showing a crankshaft rotational speed and a main shaft rotational speed when the internal combustion engine is started using a control method of the power transmission device of the invention.

A control method for the power transmission device 10 when the internal combustion engine E is started by the ECU of the invention is explained in accordance with a control flowchart shown in FIG. 4 and a graph shown in FIG. 5.

First, it is determined whether the ignition switch 73 is turned on or not (Step 1). If it is determined that the ignition switch 73 is turned on, processing advances to Step 2 in which it is determined whether the power transmission device 10 is in a neutral state or not (Step 2). If the power transmission device 10 is not in the neutral state, processing leaves this routine, while if it is determined that the power transmission device 10 is in the neutral state, processing advances to Step 3 in which it is determined whether an engine rotational speed Nc exceeds a predetermined low rotational speed N1 or not. If it is determined that the engine rotational speed Nc exceeds the predetermined low rotational speed N1, processing advances to Step 4 in which the speed change gear is changed over from the neutral state to the first speed gear.

The graph shown in FIG. 5 illustrates rectangular coordinates, wherein time t is taken on an axis of an abscissas and a rotational speed n is taken on an axis of an ordinates, and a polygonal line depicted by a chain line indicates a crankshaft rotational speed (engine rotational speed) Nc, and a polygonal line depicted by a solid line indicates a main shaft rotational speed Nm.

First, in a state wherein an operation of the internal combustion engine E is stopped initially, both of the first clutch 26 and the second clutch 27 of the twin clutch 25 are in a disengaged state, and the speed change gear mechanism 50 is in a neutral state.

Then, when the ignition switch is turned on at a point in time T1 and the starter motor is driven at a point in time Ts, the crankshaft rotational speed Nc is increased due to the driving of the starter motor, and the internal combustion engine E is started from this point in time. Thus, the crankshaft rotational speed Nc arrives at an idling rotational speed Nid. The crankshaft rotational speed Nc is maintained to the idling rotational speed Nid. Thus, the internal combustion engine E is warmed up.

In such a period, the rotation of the crankshaft 2 rotates the clutch housing 28 of the twin clutch 25 at a slightly lower rotational speed by way of meshing between the primary drive gear 23a and the primary driven gear 23b. Even when the first clutch 26 and the second clutch 27 are disengaged from each other, due to friction between the friction discs and the clutch discs which are alternately arranged close to each other, the clutch bosses 26b, 27b are rotated together with the clutch housing 28 and the co-rotation of the clutch bosses 26b, 27b rotates the main shaft 20 (inner sleeve 20i, outer sleeve 20o) together with the clutch bosses 26b, 27b.

Accordingly, as shown in FIG. 5, the main shaft rotational speed Nm is increased with a co-rotation rotational speed lower than the crankshaft rotational speed Nc along with the increase of the crankshaft rotational speed Nc.

Further, until the crankshaft rotational speed Nc arrives at the idling rotational speed Nid, at a point in time T1 at which the crankshaft rotational speed Nc arrives at a predetermined low rotational speed N1 considerably lower than the idling rotational speed Nid, by driving the speed change motor 65 of the speed change drive mechanism 60, the fifth speed change driven shift gear n5 is shifted to the left using the shift fork 64c to connect the fifth speed change driven shift gear n5 and the first speed change driven idle gear n1 thus changing over the speed change gear from a neutral state to the first speed gear.

Due to the co-rotation of the inner sleeve 20i, the first speed change driven idle gear n1 which is meshed with the first speed change drive gear m1, integrally formed with the inner sleeve 20i, is rotated together with the inner sleeve 20i, and the fifth speed change driven shift gear n5 which is stopped together with the counter shaft 51 is momentarily connected to the first speed change driven idle gear n1 which is rotated together with the inner sleeve 20i and the second clutch 27. Thus, the inner sleeve 20i of the main shaft 20 which is rotated together with the first speed change driven idle gear n1 is stopped.

The co-rotation rotational speed of the inner sleeve 20i is set to the predetermined low rotational speed N1 considerably lower than the idling rotational speed Nid. Thus, it is possible to suppress impacts and noises which are generated when the fifth speed change driven shift gear n5 is connected to the first speed change driven idling gear n1.

As has been explained heretofore, in a state that the crankshaft rotational speed Nc is set to the idling rotational speed Nid, when the speed change gear is changed over from the neutral state to the first speed gear, as indicated by a broken line in FIG. 5, a main shaft rotational speed Nm of the main shaft 20 which is rotated together with the crankshaft 2 is also set to a value close to the idling rotational speed Nid, a rotational speed N1' (see a point in time T1' in FIG. 3).

When the inertia rotation attributed to the co-rotation of a large inertia mass of the inner sleeve 20i of the main shaft 20, the second clutch 27 and the first speed change driven idle gear n1 exhibits the relatively high rotational speed N1', the speed change gear is changed over from the neutral state to the first speed gear, and the inertia mass is instantaneously connected with another large inertia mass of parts ranging from the stopped fifth speed change driven shaft gear n5 to the output-side counter shaft 51 and the like. Thus, large impacts and noises are generated at the time of connection.

To the contrary, according to this embodiment, by performing the control in which the speed change gear mechanism 60 is automatically changed over from the neutral state to the first speed gear at the point in time T1 where the engine rotational speed arrives at the predetermined low rotational speed N1 considerably lower than the idling rotational speed Nid after turning on the starter switch, it is possible to reduce the impact and noises attributed to the changeover from the neutral state to the first speed gear without providing any mechanism which suppresses the co-rotation of the main shaft 20 thus simplifying the structure, miniaturizing the internal combustion engine and reducing a manufacturing cost.

In the control method of the power transmission device according to this embodiment, the changeover from the neutral state to the first speed gear is automatically performed. Thus, the impact and noises are small whereby there may be a case a rider is not aware of the starting ready state. Accordingly, a lamp may be turned on to inform the rider of the starting ready state.

Further, at the time of performing the changeover from the neutral state to the first speed gear, by performing a control which changes over the first speed gear to the neutral state and again performs the changeover from the neutral state to the first speed gear, the rider may be informed of the starting ready state by easily feeling operational sounds generated by the repetition of the changeover.

Further, the predetermined low rotational speed N1 with which timing for changeover from the neutral state to the first speed gear is detected can be arbitrarily set. Thus, by setting a rotational speed to an extent that more or less impact sounds are generated, the rider is informed of the starting ready state.

In the vehicle having the D-mode changeover switch 74 which allows a rider to intentionally bring the vehicle into the start ready state, when the D-mode changeover switch 74 is turned on, the lamp is turned on to inform the rider of the starting ready state.

Figure 6:
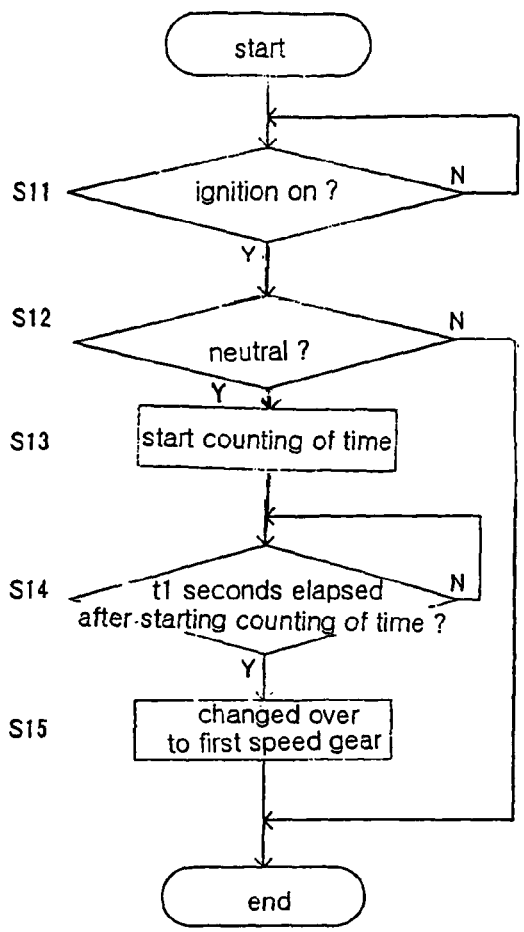
FIG. 6 is a flowchart of a control method of another power transmission device.
Figure 7:
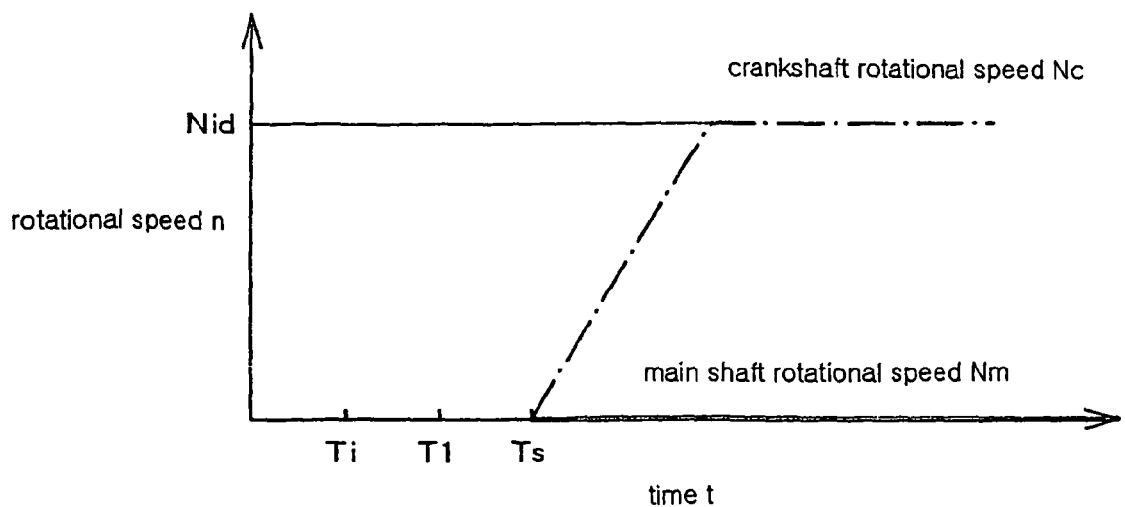
FIG. 7 is a graph showing the control method.

Next, a control method of a power transmission device according to another embodiment is explained in conjunction with FIGS. 6 and 7.

In a flowchart shown in FIG. 6, it is first determined whether the ignition switch 73 is turned on or not (Step 11). If it is determined that the ignition switch 73 is turned on, processing advances to Step 12 in which it is determined whether the power transmission device is in a neutral state or not (Step 12). If it is determined that the power transmission device is not in the neutral state, processing leaves this routine, while if it is determined that the power transmission device is in the neutral state, processing advances to Step 13 in which counting of the time is started. In Step 14, it is determined whether t1 seconds elapse or not after starting the counting of the time. If it is determined that t1 seconds elapse, processing advances to Step 15 in which the speed change gear is changed over from the neutral state to the first speed gear.

More specifically, in the control method of the power transmission device, at a point of T1 at which the predetermined time (t1 seconds) elapses after turning on the ignition switch in the power transmission device 10, the speed change gear mechanism 50 is automatically changed over from the neutral state to the first speed gear.

This point T1 is a point in time before a crankshaft rotational speed Nc arrives at a steady-state idling rotational speed Nid, wherein in the example shown in FIG. 4, the point in time T1 is before the point in time Ts at which the starter switch is turned on.

Accordingly, in a stop state in which the crankshaft 2 is not also rotated, the fifth speed change driven shift gear n5 is connected to the first speed change driven idle gear n1 to change over the speed change gear from the neutral state to the first speed gear. Thus, neither impacts nor noises are generated at the time of connection.

Even when the crankshaft 2 is rotated by turning on the starter switch and the crankshaft rotational speed Nc is elevated, the inner sleeve 20i of the main shaft 20 is stopped by braking due to the connection of the fifth speed change driven shift gear n5 with the first speed change driven idle gear n1. Thus, the main shaft rotational speed Nm remains at 0.

Also in the control method of the power transmission device of this embodiment, by alternately repeating the lighting of the lamp and the changeover of the speed change mechanism between the neutral state and the first speed gear, the rider may be informed of the starting ready state.

Further, in the vehicle having the D-mode changeover switch 74, when the D-mode changeover switch 74 is turned on, the lamp is turned on to inform the rider of the starting ready state.

In the example shown in FIG. 7, the point in time T1 at which the predetermined time elapses after turning on the ignition switch comes before the point in time Ts at which the starter switch is turned on. However, the point in time T1 may come after the point in time Ts at which the starter switch is turned on. In such a case, the control method of the power transmission device becomes equal to the control method of the power transmission device of the embodiment shown in FIG. 5. Thus, impacts and noises which are generated at the time of changing over the speed change gear from the neutral state to the first speed gear can be suppressed to small values.

Figure 8:
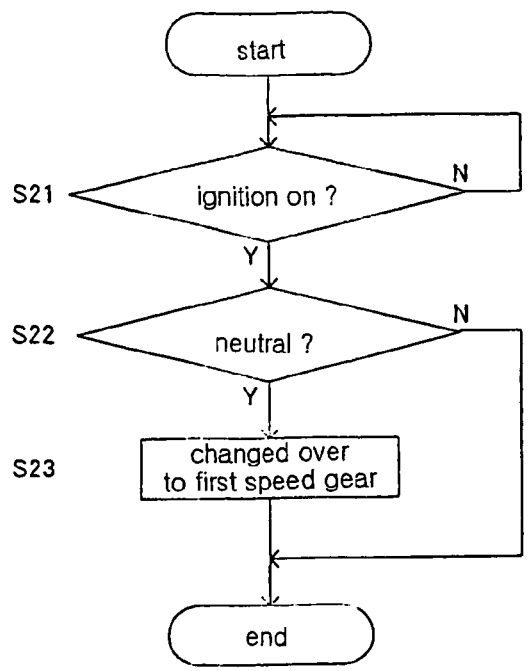
FIG. 8 is a flowchart of a control method of a still another power transmission device.
Figure 9:
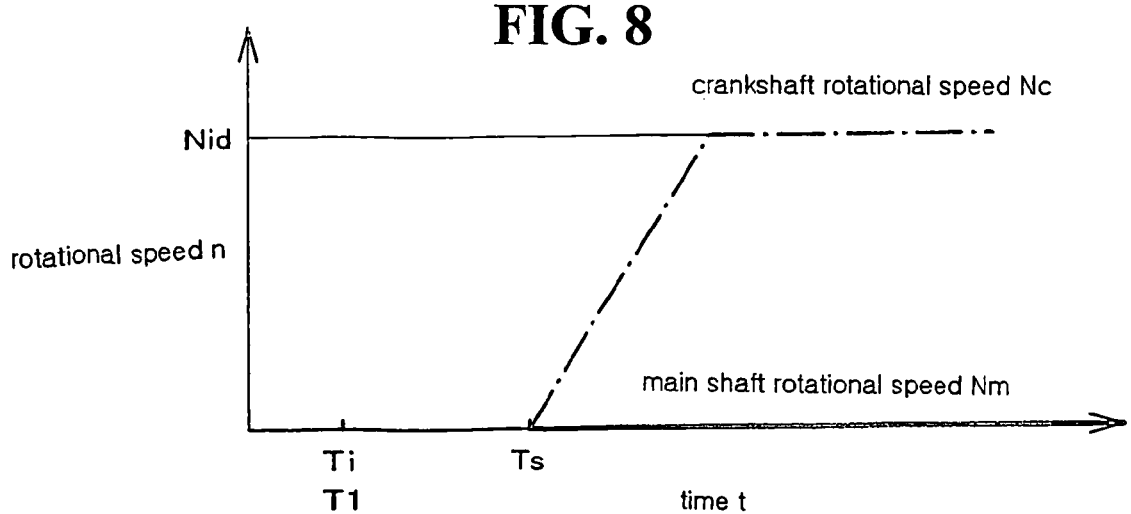
FIG. 9 is a graph showing the control method.

Further, a control method of a power transmission device according to another embodiment is explained in conjunction with FIGS. 8 and 9.

In a flowchart shown in FIG. 8, it is first determined whether the ignition switch 73 is turned on or not (Step 21). If it is determined that the ignition switch 73 is turned on, processing advances to Step 22 in which it is determined whether the power transmission device is in a neutral state or not (Step 22). If it is determined that the power transmission device is not in the neutral state, processing leaves this routine, while if it is determined that the power transmission device is in the neutral state, processing advances to Step 23, and the speed change gear is immediately changed over from the neutral state to the first speed gear.

More specifically, in the control method of the power transmission device, if it is determined that the power transmission device 10 is in the neutral state at a point in time at which the ignition switch is turned on, a speed change gear mechanism is automatically changed over from the neutral state to the first speed gear.

The crankshaft 2 is stopped at a point in time wherein the ignition switch is turned on. Thus, the fifth speed change driven shift gear n5 which is in a stopped state is connected to the first speed change driven idle gear n1 which is also in a stopped state thus changing over the speed change gear from the neutral state to the first speed gear. Thus, impacts and noises are not generated at the time of the connection.

Also in the control method of the power transmission device of this embodiment, by alternately repeating lighting of the lamp and the changeover of the speed change mechanism between the neutral state and the first speed gear, the rider may be informed of the starting ready state.

Further, in the vehicle having the D-mode changeover switch 74, when the D-mode changeover switch 74 is turned on, the lamp is turned on to inform the rider of the starting ready state.

In the above-mentioned embodiments, the clutch mechanism of the power transmission device 10 adopts the hydraulic twin clutch 25. The invention is, however, applicable to a clutch mechanism constituted of one clutch.

Further, the twin clutch 25 of this embodiment is formed of a clutch which assumes an engaged state when oil pressure is applied. However, it is needless to say that the invention is also applicable to a clutch which assumes an engaged state when the oil pressure is released.

Still further, the clutch mechanism is applicable to a motor driven clutch as well as the hydraulic clutch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control method for a power transmission device for controlling a power transmission device for transmitting rotational power of a crankshaft of an internal combustion engine to an output side by way of a clutch mechanism and a speed change mechanism, comprising the following step:
    automatically changing over the speed change mechanism from a neutral state to a first speed gear during a period from a point in time at which an ignition switch is turned on to a point in time at which an engine rotational speed arrives at a steady-state idling rotational speed due to starting of an internal combustion engine,
    wherein if it is determined that the transmission device is not in the neutral state, processing ends.

2. The control method for a power transmission device according to claim 1, wherein the speed change mechanism is automatically changed over from the neutral state to the first speed gear at a point in time at which the engine rotational speed arrives at a predetermined low-rotational speed lower than the idling rotational speed by turning on a starter switch.

3. The control method for a power transmission device according to claim 1, wherein the speed change mechanism is automatically changed over from the neutral state to the first speed gear at a point in time at which a predetermined time elapses after turning on the ignition switch.

4. The control method for a power transmission device according to claim 1, wherein if it is determined that the engine rotational speed exceeds a predetermined low rotational speed, a change over from the neutral state to the first speed gear occurs.

5. The control method for a power transmission device according to claim 1, wherein if it is determined that the engine rotational speed does not exceed a predetermined low rotational speed, processing proceeds to again calculate the engine rotational speed until the engine rotational speed exceeds a predetermined low rotational speed wherein a change over from the neutral state to the first speed gear occurs.

6. The control method for a power transmission device according to claim 1, wherein if it is determined that a predetermined time has elapsed after turning on a starter switch, an automatic changing from the neutral position to the first speed gear is achieved.

7. The control method for a power transmission device according to claim 1, wherein if it is determined that a predetermined time has not elapsed after turning on a starter switch, the counting of time continues until a predetermined time has elapsed wherein an automatic changing from the neutral position to the first speed gear is then achieved.

8. A control method for a power transmission device for controlling a power transmission device for transmitting rotational power of a crankshaft of an internal combustion engine to an output side by way of a clutch mechanism and a speed change mechanism, comprising the following step:
    determining a neutral state for the power transmission; and
    automatically changing over the speed change mechanism from the neutral state to a first speed gear during a period from a point in time at which an ignition switch is turned on to a point in time at which an engine rotational speed arrives at a steady-state idling rotational speed due to starting of an internal combustion engine,
    wherein if it is determined that the engine rotational speed exceeds a predetermined low rotational speed, a change over from the neutral state to the first speed gear occurs.

9. The control method for a power transmission device according to claim 8, wherein the speed change mechanism is automatically changed over from the neutral state to the first speed gear at a point in time at which the engine rotational speed arrives at a predetermined low-rotational speed lower than the idling rotational speed by turning on a starter switch.

10. The control method for a power transmission device according to claim 8, wherein if it is determined that the transmission device is not in the neutral state, processing ends.

11. The control method for a power transmission device according to claim 8, wherein if it is determined that the engine rotational speed does not exceed a predetermined low rotational speed, processing proceeds to again calculate the engine rotational speed until the engine rotational speed exceeds a predetermined low rotational speed wherein a change over from the neutral state to the first speed gear occurs.

12. A control method for a power transmission device for controlling a power transmission device for transmitting a rotational power of a crankshaft of an internal combustion engine to an output side by way of a clutch mechanism and a speed change mechanism, comprising the following step:
    automatically changing over the speed change mechanism from a neutral state to a first speed gear at a point in time wherein an ignition switch is turned on,
    wherein if it is determined that an engine rotational speed does not exceed a predetermined low rotational speed, processing proceeds to again calculate the engine rotational speed until the engine rotational speed exceeds said predetermined low rotational speed wherein a change over from the neutral state to the first speed gear occurs.

13. The control method for a power transmission device according to claim 12, wherein if it is determined that the transmission device is not in the neutral state, processing ends.

* * * * *